(12) United States Patent
Boxey (10) Patent No.: US 7,175,196 B2
(45) Date of Patent: Feb. 13, 2007

(54) SUPPORT BRACKET FOR AN INFLATABLE CURTAIN

(75) Inventor: Kevin J. Boxey, Columbiaville, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 232 days.

(21) Appl. No.: 10/774,663

(22) Filed: Feb. 9, 2004

(65) Prior Publication Data

US 2005/0173902 A1    Aug. 11, 2005

(51) Int. Cl.
*B60R 21/16*    (2006.01)
(52) U.S. Cl. .................................. 280/730.2
(58) Field of Classification Search ............. 280/730.2, 280/728.2, 728.1, 730.1
See application file for complete search history.

(56) References Cited

U.S. PATENT DOCUMENTS

| | | | |
|---|---|---|---|
| 6,022,044 A | 2/2000 | Cherry | |
| 6,142,509 A | 11/2000 | White, Jr. et al. | |
| 6,149,185 A | 11/2000 | White, Jr. et al. | |
| 6,364,349 B1 | 4/2002 | Kutchey et al. | |
| 6,439,598 B1 | 8/2002 | Braun et al. | |
| 6,793,241 B2 * | 9/2004 | Wallner et al. | 280/730.2 |

FOREIGN PATENT DOCUMENTS

EP    0904992    3/1999

* cited by examiner

*Primary Examiner*—Faye M. Fleming
(74) *Attorney, Agent, or Firm*—Tarolli, Sundheim, Covell & Tummino LLP (57) ABSTRACT

An apparatus (10) helps to protect an occupant of a vehicle (12) that has a roof (18), a side structure (16), and a trim piece (220) overlying the side structure. The apparatus (10) includes an inflatable curtain (14) inflatable away from the roof (18) to a position adjacent the side structure (16). An inflation fluid source (24) provides inflation fluid for inflating the inflatable curtain (14). A fill tube (22) directs inflation fluid from the inflation fluid source (24) into the inflatable curtain (14). A bracket (120) connects the fill tube (22) to the vehicle (12). The bracket (120) includes a fill tube support portion (140) connectable with the fill tube (22). A connecting portion (130) is connectable with the vehicle (12). A deployment portion (150) directs the inflatable curtain (14) to deploy inboard of the trim piece (220).

24 Claims, 5 Drawing Sheets

SUPPORT BRACKET FOR AN INFLATABLE CURTAIN

FIELD OF THE INVENTION

The present invention relates to an inflatable apparatus for helping to protect a vehicle occupant in the event of a side impact to the vehicle and/or a vehicle rollover.

BACKGROUND OF THE INVENTION

It is known to inflate an inflatable vehicle occupant protection device to help protect a vehicle occupant. One particular type of inflatable vehicle occupant protection device is an inflatable curtain. The inflatable curtain is inflatable away from the roof of the vehicle between a vehicle occupant and the side structure of the vehicle in response to a side impact to the vehicle and/or a vehicle rollover. A known inflatable curtain is inflated from a deflated condition with inflation fluid directed from an inflator to the inflatable curtain.

SUMMARY OF THE INVENTION

The present invention relates to an apparatus for helping to protect an occupant of a vehicle that has a roof, a side structure, and a trim piece overlying the side structure. The apparatus includes an inflatable curtain inflatable away from the roof to a position adjacent the side structure. An inflation fluid source provides inflation fluid for inflating the inflatable curtain. A fill tube directs inflation fluid from the inflation fluid source into the inflatable curtain. A bracket connects the fill tube to the vehicle. The bracket includes a fill tube support portion connectable with the fill tube. A connecting portion is connectable with the vehicle. A deployment portion directs the inflatable curtain to deploy inboard of the trim piece.

The present invention also relates to an apparatus for helping to protect an occupant of a vehicle that has a roof, a side structure, and a trim piece overlying the side structure. The apparatus includes an inflatable curtain that is inflatable away from the vehicle roof to a position adjacent the side structure of the vehicle. An inflation fluid source provides inflation fluid for inflating said inflatable curtain. A fill tube directs inflation fluid from the inflation fluid source into the inflatable curtain. A bracket connects the fill tube to the vehicle and directs the inflatable curtain to deploy inboard of the trim piece.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF AN EMBODIMENT

Figure 1:
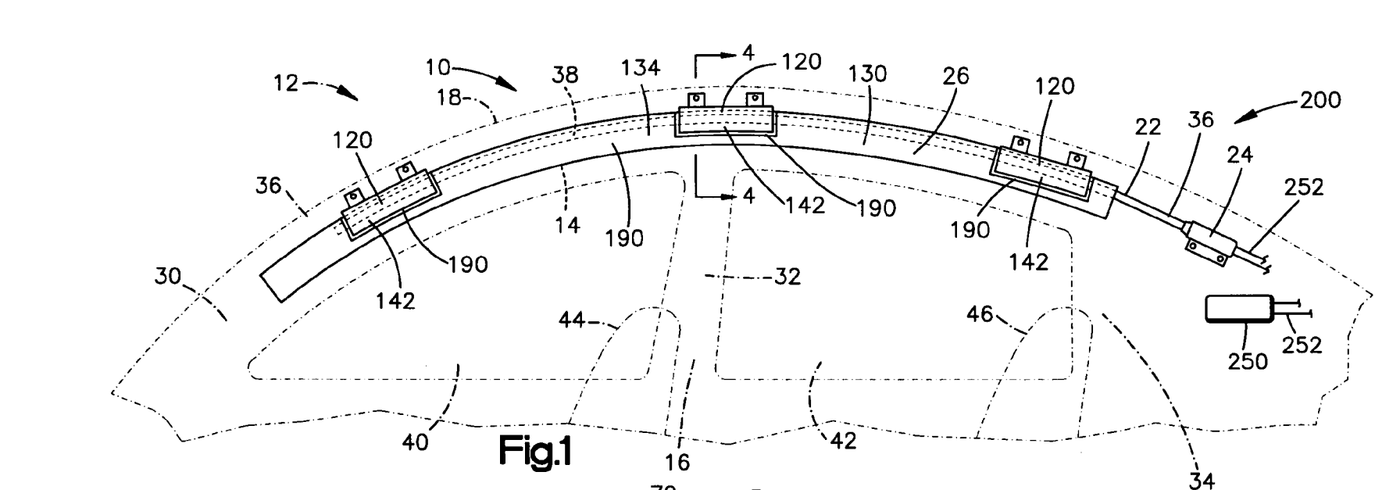
FIG. 1 is a schematic view of an apparatus for helping to protect a vehicle occupant illustrating the apparatus in a deflated and stored condition in a vehicle, according to a first embodiment of the present invention.
Figure 2:
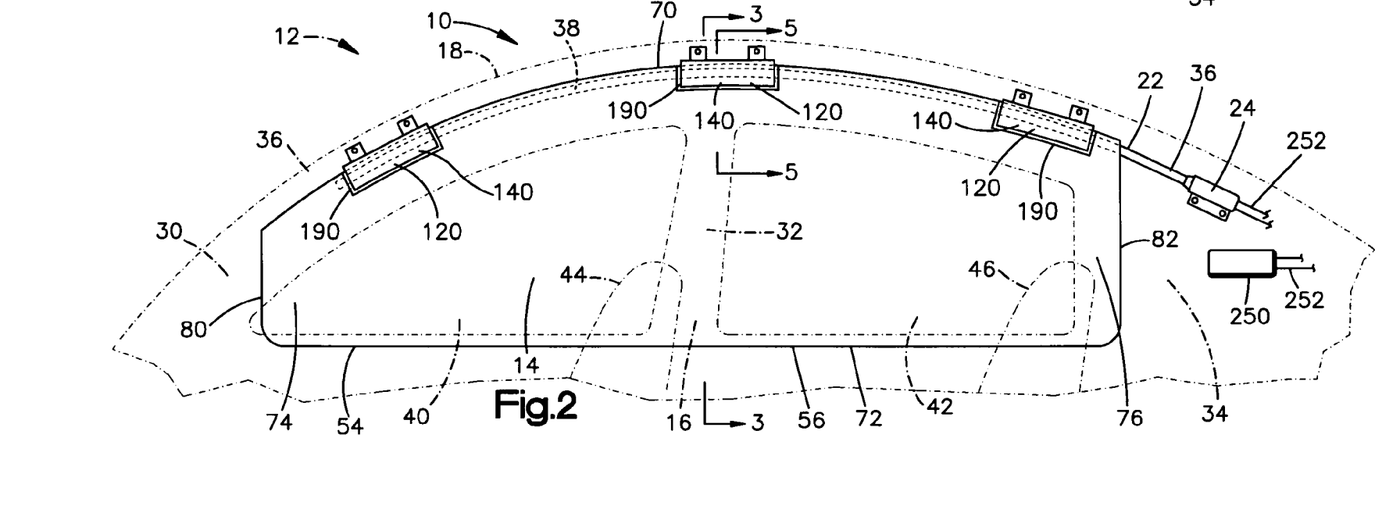
FIG. 2 is a schematic view of the apparatus of FIG. 1 in an inflated condition in the vehicle.

Representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and the roof 18 of the vehicle. The side structure 16 of the vehicle 12 includes an A pillar 30, a B pillar 32, a C pillar 34, and front and rear side windows 40 and 42. The vehicle 12 also includes front vehicle seating 44 positioned adjacent the front side window 40 and rear vehicle seating 46 positioned adjacent the rear side window 42.

An inflator 24 is connected in fluid communication with the inflatable curtain 14 through a fill tube 22. The fill tube 22 may be constructed of any suitable material, such as metal or plastic. The fill tube 22 has a first end portion 36 for receiving fluid from the inflator 24. The fill tube 22 may be connected directly to the inflator 24 or a manifold (not shown) may connect the fill tube to the inflator. The fill tube 22 has a second end portion 38 disposed in the inflatable curtain 14.

The inflator 24 contains a stored quantity of pressurized inflation fluid (not shown) in the form of a gas for inflating the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 may include a cover 26 (FIG. 1), such as a fabric sheath or plastic housing, that helps support the inflatable curtain 14 in a stored and deflated condition. The deflated inflatable curtain 14 and the cover 26 have an elongated configuration and extend along the vehicle roof 18 and along the side structure 16 of the vehicle 12 above the side windows 40 and 42. The fill tube 22, inflatable curtain 14 and cover 26 are connected to the vehicle 12 by brackets 120.

The inflatable curtain 14 (FIG. 3) includes panels 50 and 52 of material that are arranged in an overlying manner. Overlapping portions of the panels 50 and 52 are interconnected along at least a portion of a perimeter 54 of the inflatable curtain 14 to form a perimeter connection 56 of the curtain. The perimeter connection 56 helps define an inflatable volume of the inflatable curtain 14. The inflatable curtain 14 may also include interior connections (not shown) in which the overlying panels 50 and 52 are interconnected within the perimeter 54 to form non-inflatable portions that help define inflatable chambers of the curtain.

Figure 3:
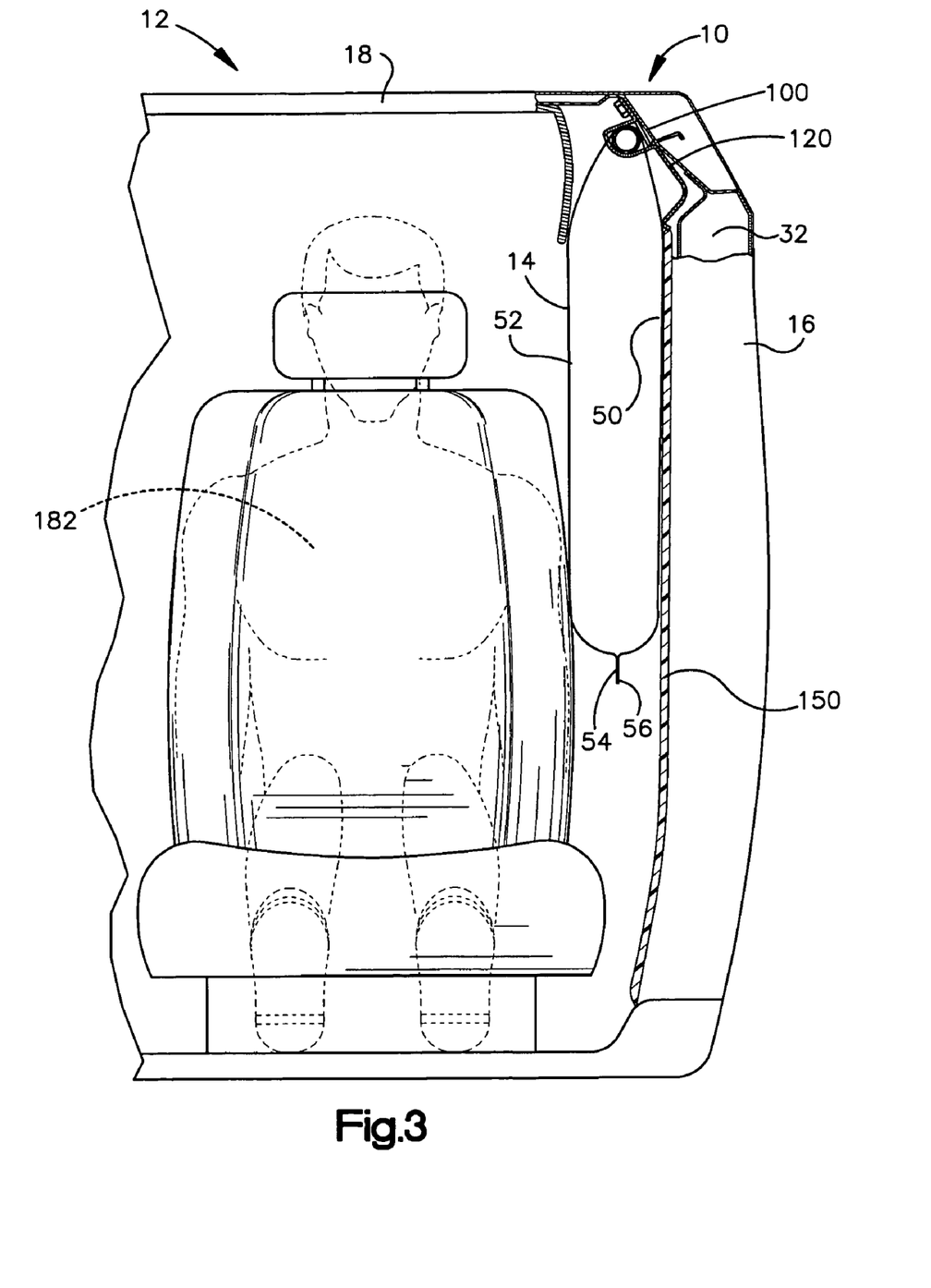
FIG. 3 is a sectional view taken generally along line 3—3 in FIG. 2.

The inflatable curtain 14 may be formed in a variety of manners, such as by interweaving the overlying panels 50 and 52, stitching the panels together, or interconnecting the panels via ultrasonic welding, heat bonding, or adhesives. In a woven construction, the overlying panels 50 and 52 may be woven/interwoven simultaneously from a material, such as nylon yarn, and may be coated with a gas impermeable material, such as urethane, or laminated with a gas impermeable film. The inflatable curtain 14 thus may have a substantially gas-tight construction. Those skilled in the art will appreciate that alternative materials, such as polyester yarn, and alternatives coatings, such as silicone, may also be used to construct the inflatable curtain 14.

The perimeter 54 of the inflatable curtain 14 is defined at least partially by an upper edge 70, an opposite lower edge 72 of the curtain, and front and rear portions 74 and 76, respectively, of the inflatable curtain spaced apart horizontally along the upper and lower edges. The front and rear portions 74 and 76 of the inflatable curtain 14 include front and rear edges 80 and 82, respectively, that are spaced horizontally apart along the upper and lower edges 70 and 72 and extend between the upper and lower edges.

Figure 4:
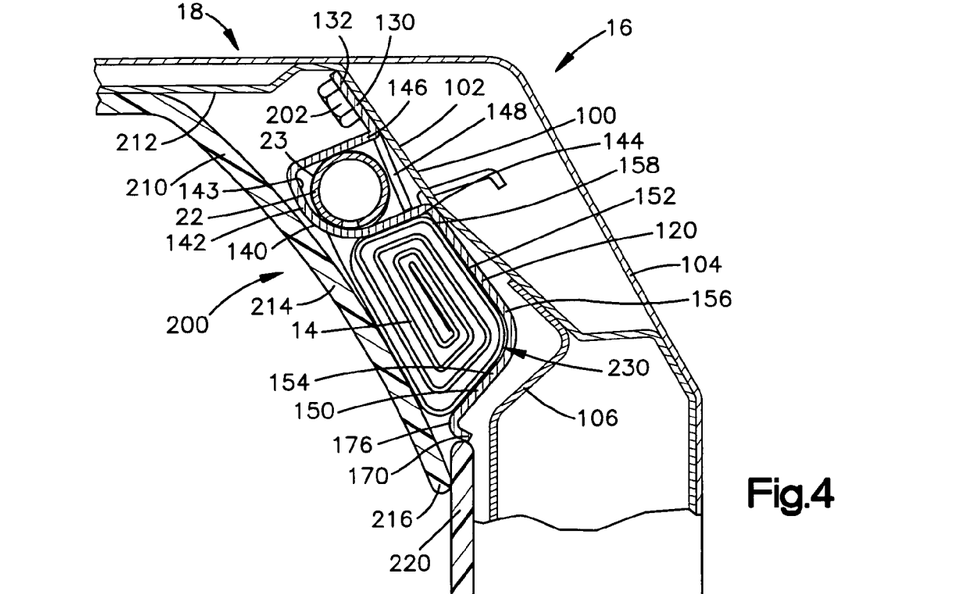
FIG. 4 is a sectional view taken generally along line 4—4 in FIG. 1.
Figure 5:
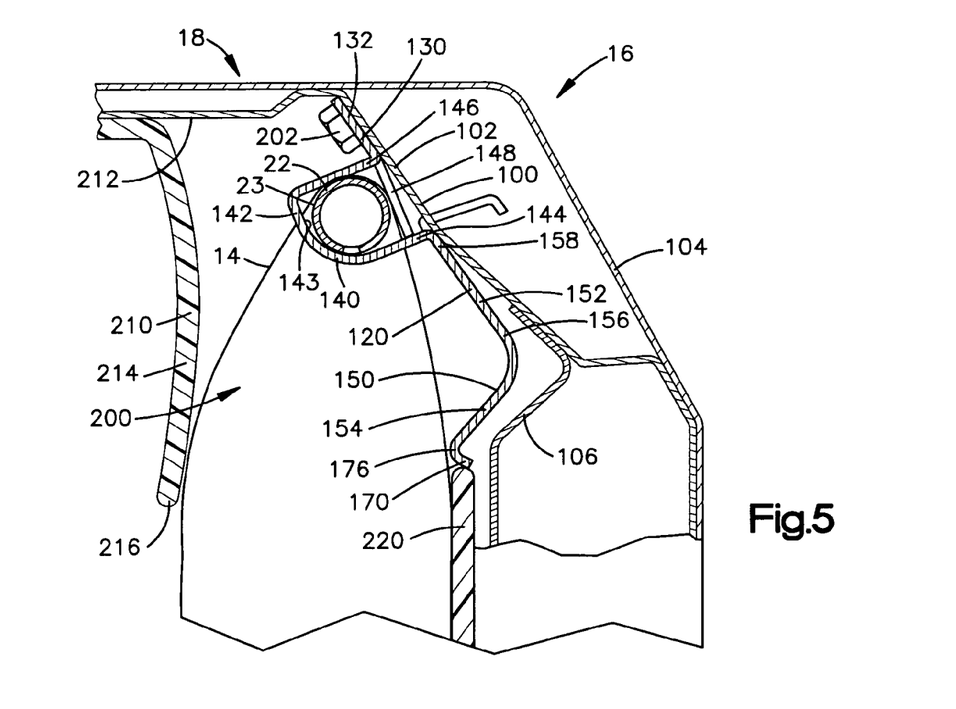
FIG. 5 is a sectional view taken generally along line 5—5 in FIG. 2.

As illustrated in FIGS. 3–5, a vehicle roof rail 100 is located at the intersection of the side structure 16 of the vehicle and the vehicle roof 18. The side structure 16, roof 18 and roof rail 100 are formed from pieces of sheet metal that are stamped or otherwise formed into predetermined shapes and welded or otherwise connected to form a desired structure. As best shown in FIGS. 4 and 5, inner and outer pieces of sheet metal 102 and 104, respectively, are used to form the side structure 16, roof 18 and roof rail 100. A third piece of sheet metal 106 helps to form the B pillar 32 of the vehicle 12. Those skilled in the art will, however, appreciate that the side structure 16, roof 18, roof rail 100, and B pillar 32 may have alternative constructions.

The brackets 120 are preferably constructed of a single piece of high-strength material, such as metal, that may be formed through a variety of metalworking operations, such as stamping, hydroforming, bending, and machining. Alternative materials, such as plastics or composites, and alternative constructions, such as a multi-piece construction, could also be used to form the brackets 120.

Figure 6A:
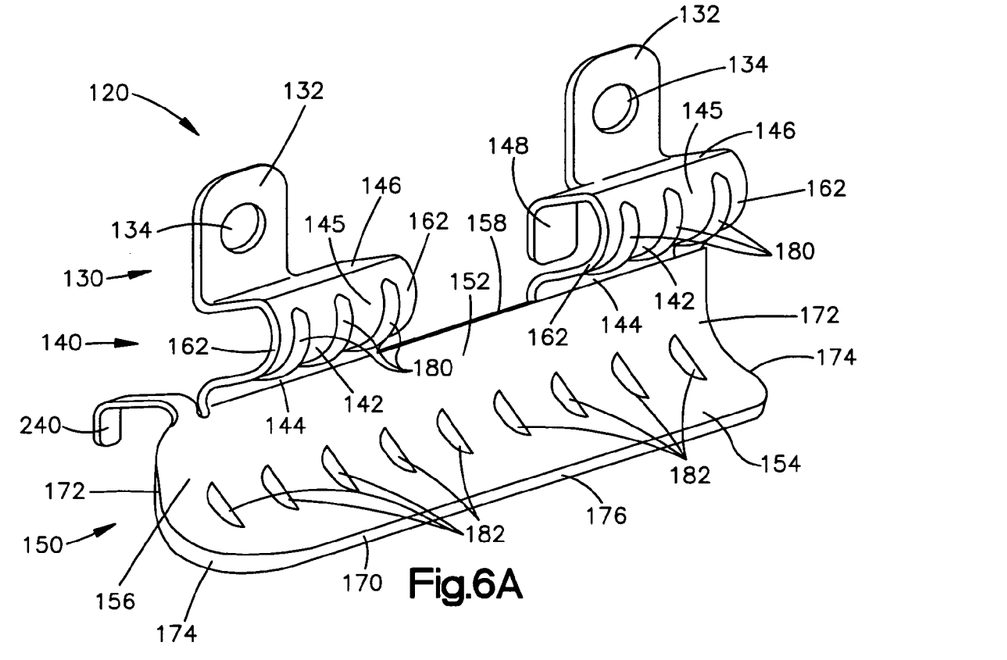
FIGS. 6A and 6B are perspective views of a portion of the apparatus of FIGS. 1–5.
Figure 6B:
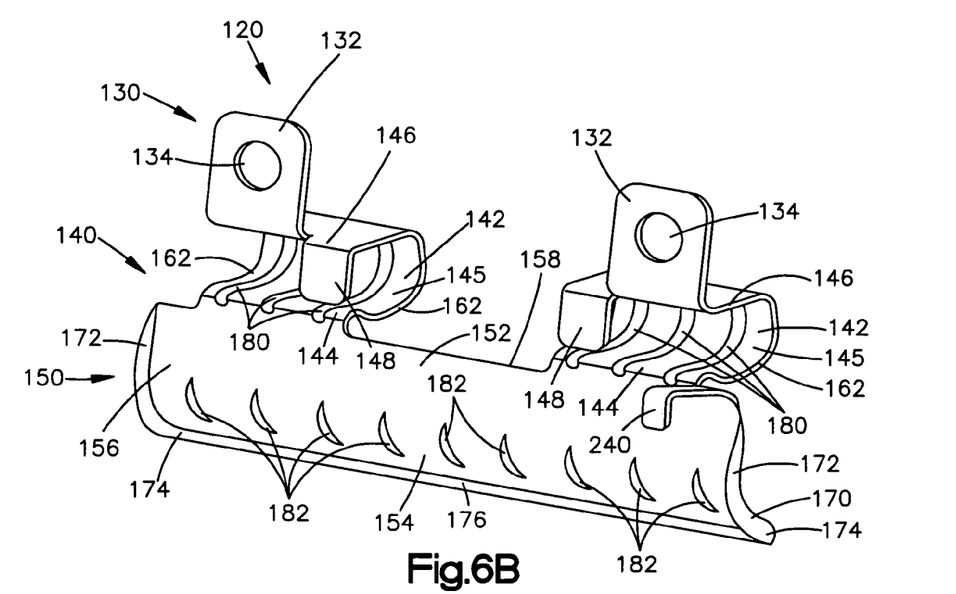

Referring to FIGS. 6A and 6B, each bracket 120 includes a connecting portion 130, a fill tube support portion 140, and a deployment portion 150. The deployment portion 150 spans the length of the bracket 120. The deployment portion 150 includes a generally planar main portion 152 and a ramp portion 154. The ramp portion 154 curves away from a lower edge portion 156 of the main portion 152 and extends transverse to the main portion. For example, in the embodiment illustrated in FIGS. 1–6B, the ramp portion 154 may extend at an angle of about 105 degrees relative to the main portion 152.

The fill tube support portion 140 includes a pair of spaced generally C-shaped supports 142 that extend transversely from an upper edge portion 158 of the main portion 152, opposite the lower edge portion 156. The fill tube support portion 140 may include one or more such supports 142. Each of the supports 142 has a first end portion 144 that merges with the upper edge portion 158 and extends away from the main portion 152 in a general direction similar to that in which the ramp portion 154 extends. Each of the supports 142 also has a second end portion 146 opposite the first end portion 144 that terminates vertically above the first end portion. Each of the supports 142 also has a central or middle portion 145 that has a generally curved or C-shaped configuration and extends between the first and second end portions 144 and 146.

The connecting portion 130 includes a pair of spaced flange portions 132, each of which may include an aperture 134 that extends through the flange. A flange portion 132 is associated with a respective one of the supports 142. The connecting portion 130 may include one or more such flange portions 132, depending on the number of supports 142 included on the bracket 120. Each flange portion 132 extends transversely from the second end portion 146 of the support 142 with which it is associated. The flange portions 132 may be coplanar with the main portion 152 of the deployment portion 150. Each support 142 also includes a tab portion 148 that extends transversely from its second end portion 146 in a direction opposite the corresponding respective flange portion 132.

As shown in FIGS. 6A and 6B, the fill tube support portion 140 and deployment portion 150 may have edge portions that are rounded over. In the embodiment of FIGS. 6A and 6B, the supports 142 of the fill tube support portion 140 may have rounded over edge portions 160 that extend along opposite lateral edges 162 of the supports. The deployment portion 150 has a rounded over edge portion 170 (FIGS. 4 and 5) that extends along opposite lateral edges 172 of the main portion 152, along opposite lateral edges 174 of the ramp portion 154, and along a forward edge 176 of the ramp portion 154.

The fill tube support portion 140 and the deployment portion 150 may also include reinforcing portions for improving their structural integrity. In the embodiment of FIGS. 6A and 6B, the supports 142 of the fill tube support portion 140 may include reinforcing ribs 180 spaced along a curved portion of the supports that extends between the first and second end portions 144 and 146. The deployment portion 150 may include reinforcing ribs 182 that extend between the main portion 152 and the ramp portion 154. The reinforcing ribs 180 and 182 may help prevent the fill tube support portion 140 and deployment portion 150 from bending or being otherwise deformed from the condition illustrated in FIGS. 6A and 6B.

As shown in FIG. 1, the inflatable curtain 14 and cover 26 may have respective apertures 190 that expose portions of the fill tube 22. In an assembled condition of the apparatus 10, the brackets 120 may extend through the apertures 190 in the inflatable curtain 14 and cover 26 such that the fill tube 22 may be received in the supports 142. Referring to FIGS. 4 and 5, with the fill tube 22 positioned in the supports 142, the tab portions 148 may be bent over or otherwise deformed to lock the supports onto the fill tube. The tab portions 148 may be bent over with a force sufficient to cause the fill tube 22 to be clamped in the supports 142. The fill tube support portion 140 is thus operative to connect the fill tube 22 to the bracket 120. When the fill tube 22 is connected to the bracket 120, a cylindrical outer surface 23 of the fill tube may mate with a cylindrical portion of an inner surface 143 of the supports 142.

In the assembled condition, the inflatable curtain 14 (FIG. 1), cover 26, fill tube 22, inflator 24, and brackets 120 may form a module 200 that may be installed in the vehicle 12. As shown in FIGS. 4 and 5, the module 200 is positioned adjacent the roof rail 100 near the intersection of the side structure 16 and roof 18. Fasteners 202, such as bolts, may then be passed through the apertures 134 in the supports 132 and screwed into the roof rail 100 to secure the module 200 fixedly to the vehicle 12. The bracket 120 may include projections 240, such as hooks, that may be used initially to support the module 200 in the vehicle 12 while the fasteners 202 are installed.

When the module 200 is installed in the vehicle 12, the main portion 152 extends along the side structure 16 of the vehicle 12 in a direction generally downward and away from the vehicle roof 18, as viewed in FIGS. 4 and 5. The ramp portion 154 extends transverse to the main portion 152 in a direction generally away from the vehicle side structure 16, diagonally downward and inboard of the vehicle side structure, as viewed in FIGS. 4 and 5.

The deployment portion 150 forms a generally concave channel 230 for receiving the inflatable curtain 14 and cover 26 in a stored condition. The inflatable curtain 14 can be placed in the stored condition by rolling the curtain in an outboard direction, as shown in FIG. 4, or by rolling the curtain in an opposite inboard direction (not shown). Alternatively, the inflatable curtain 14 can be placed in the stored condition by folding the curtain or by a combination of rolling and folding the curtain.

The module 200, when in the installed condition of FIGS. 1 and 4, extends along the roof rail 100 and along the intersection of the side structure 16 and the roof 18. The vehicle 12 includes a headliner 210 that extends along an inner surface 212 of the roof 18 of the vehicle. The headliner 210 has a portion 214 that extends at an acute angle relative to the roof 18 adjacent the module 200. The portion 214 of the headliner 210 overlies the module 200 and conceals the module in the vehicle 12. A terminal end 216 of the headliner 210 is in abutting engagement with a trim piece 220 of the vehicle 12.

Those skilled in the art will recognize that the configuration of the vehicle structure and, thus, the spatial and interconnecting relationships between the vehicle structure (i.e., the side structure 16, roof 18, and roof rail 100) and the headliner 210, trim piece 220 and module 200 may vary depending upon the particular design of the vehicle 12. Therefore, it should be recognized that the vehicle structure illustrated in FIGS. 4 and 5 and the spatial and interconnecting relationships between the vehicle structure and the headliner 210, trim piece 220 and module 200 is for illustrative purposes and may vary without departing from the spirit of the present invention.

As shown in FIG. 4, the trim piece 220 overlies the B pillar 32 of the vehicle 12 and is positioned generally adjacent and below the module 200. Similar trim pieces (not shown) may also overlie the A pillar 30 and C pillar 34 (FIGS. 1 and 2) of the vehicle 12. The configuration of the vehicle structure and the spatial and interconnecting relationships between the vehicle structure and the headliner 210, trim piece 220 and module 200 at these locations would be similar to that illustrated in FIGS. 4 and 5. Therefore, FIGS. 4 and 5 may be illustrative of the module 200 and the vehicle 12 at the A pillar 30, B pillar 32, and C pillar 34 of the vehicle 12.

The vehicle 12 includes a sensor mechanism 250 (shown schematically in FIGS. 1 and 2) for sensing the occurrence of an event for which inflation of the inflatable curtain 14 is desired, such as a side impact to the vehicle 12 and/or a vehicle rollover. Upon sensing the occurrence of such an event, the sensor mechanism 250 provides an electrical signal over lead wires 252 to the inflator 24. The electrical signal causes the inflator 24 to be actuated in a known manner. The inflator 24 discharges fluid under pressure through fill tube 22, which directs the fluid into the inflatable curtain 14.

The inflatable curtain 14 inflates under the pressure of the inflation fluid from the inflator 24. This causes the cover 26 to open, for example, along a tear seam (not shown), which permits the curtain to inflate away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. The inflatable curtain 14 covers portions of the vehicle side structure that extend between the A pillar 30 and the C pillar 34 of the vehicle 12 and may overlie portions of the A pillar, C pillar, and the B pillar 32 of the vehicle. The inflatable curtain 14, when inflated, may be positioned between the vehicle side structure 16 and the front and rear vehicle seating 44 and 46.

Those skilled in the art will appreciate that the extent and coverage of the inflatable curtain 14 in the vehicle 12 may vary. For example, the extent and coverage of the inflatable curtain 14 may vary depending on a variety of factors, such as the architecture of the vehicle 12, the position of the inflatable curtain 14 in the vehicle, and the desired extent or coverage of the inflatable curtain.

The inflatable curtain 14, when inflated, helps to protect a vehicle occupant in the event of a vehicle rollover or a side impact to the vehicle 12. The inflatable curtain 14 may cover an area of the side structure 16 extending from the A pillar 30 to the C pillar 34 and from the roof 18 down to adjacent or below the side windows 40 and 42. The inflatable curtain 14, when inflated, helps to absorb the energy of impacts with the curtain and helps to distribute the impact energy over a large area of the curtain.

Referring to FIGS. 4 and 5, as a feature of the present invention, the deployment portion 150 helps to deflect or otherwise direct the inflatable curtain 14 to inflate inboard of the trim piece 220, between the trim piece and any occupant of the vehicle. During inflation of the inflatable curtain 14, the ramp portion 154 of the deployment portion 150 helps prevent the curtain from getting caught on the trim piece 220 or inflating between the trim piece and the side structure 16. The ramp portion 154 directs the inflatable curtain 14 to deploy in an inboard direction (i.e., to the left as viewed in FIGS. 3–5) around the trim piece 220.

As shown in FIGS. 1 and 2, the brackets 120 are positioned along the side structure 16 to coincide with the A pillar 30, B pillar 32, and C pillar 34 of the vehicle 12. This places ramp portions 154 adjacent respective trim pieces on the pillars and thus helps direct the inflatable curtain 14 to inflate inboard of these trim pieces at each of the pillars.

Figure 7A:
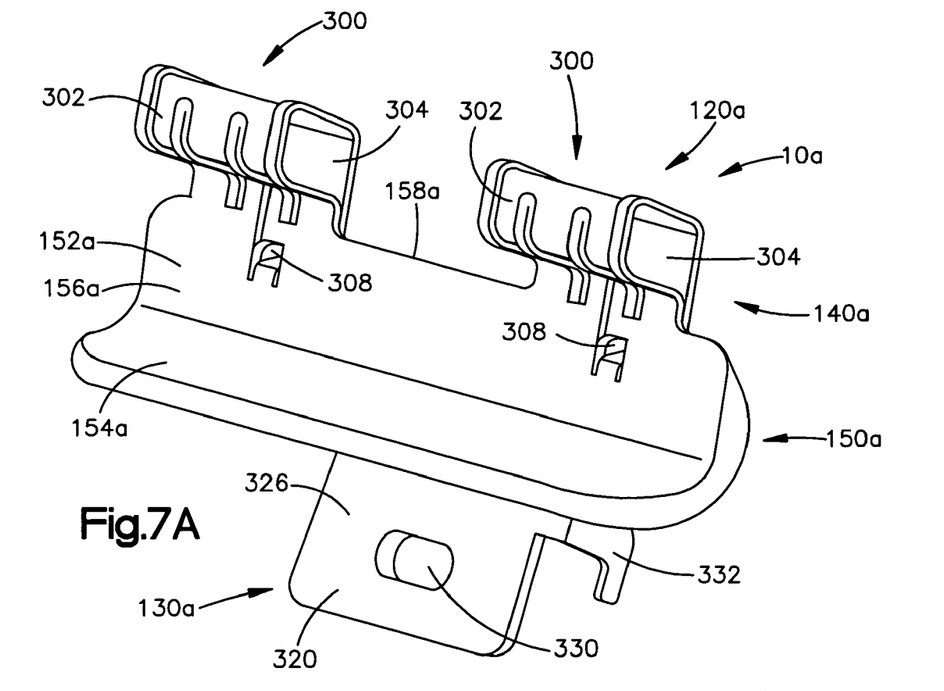
FIGS. 7A and 7B are perspective views of a portion of the apparatus of FIGS. 1–5, according to a second embodiment of the present invention.
Figure 7B:
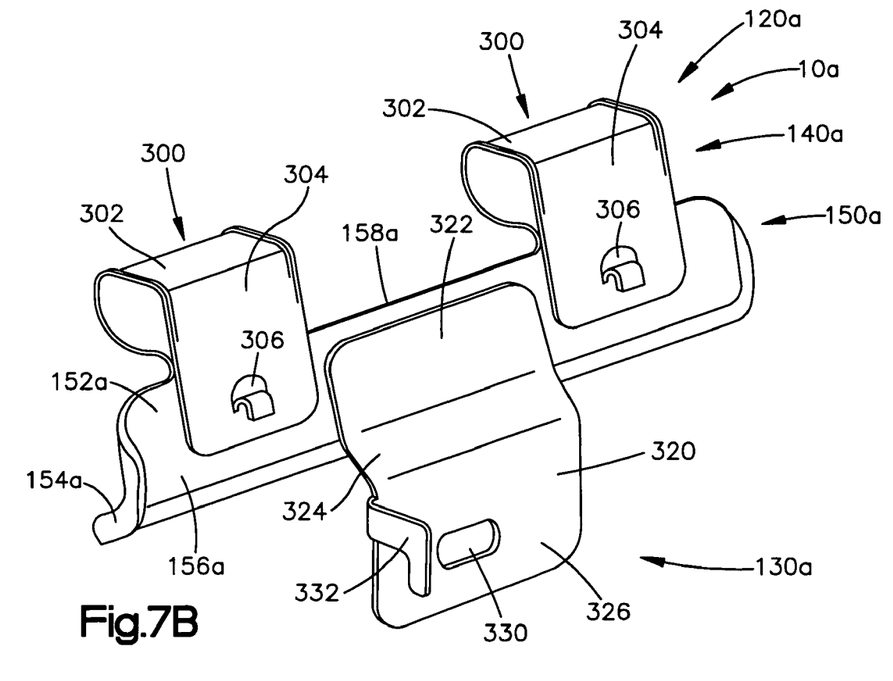

A second embodiment of the present invention is illustrated in FIGS. 7A and 7B. The second embodiment of the invention is similar to the first embodiment of the invention illustrated in FIGS. 1–6B. Accordingly, numerals similar to those of FIGS. 1–6B will be utilized in FIGS. 7A and 7B to identify similar components, the suffix letter "a" being associated with the numerals of FIGS. 7A and 7B to avoid confusion. The second embodiment of the present invention is similar to the first embodiment, except that the bracket of the second embodiment has a different configuration than the bracket of the first embodiment.

Referring to FIGS. 7A and 7B, an apparatus 10a comprises a bracket 120a that includes a connecting portion 130a, a fill tube support portion 140a, and a deployment portion 150a. The deployment portion 150a spans the length of the bracket 120a. The deployment portion 150a includes a generally planar main portion 152a and a ramp portion 154a. The ramp portion 154a curves away from a lower edge portion 156a of the main portion 152a and extends transverse to the main portion. For example, in the embodiment of FIGS. 7A and 7B, the ramp portion 154a may extend at an angle of about 105 degrees relative to the main portion 152a.

The fill tube support portion 140a includes a pair of spaced supports 300 that extend transversely from upper edge portion 158a of the main portion 152a, opposite the lower edge portion 156a. The fill tube support portion 140a may include one or more such supports 300. Each support 300 includes a clamping portion 302 that has a generally C-shaped cross-section and merges with the upper edge portion 158a. Each of the supports 300 also includes a clamping flange portion 304 that extends generally parallel to the main portion 152a. Portions of each clamping flange portion 304 overlie respective portions of the main portion 152a. Each clamping flange portion 304 has an aperture 306 that is aligned with a respective aperture 308 in the main portion 152a.

The connecting portion 130a includes a flange portion 320. The connecting portion 130a may include more than one such flange portion 320. The flange portion 320 of the second embodiment is a piece of metal separate from the single piece used to construct the fill tube support portion 140a and deployment portion 150a.

The flange portion 320 includes a main portion 322 fixed to the main portion 152a of the deployment portion 150a by known means, such as welding. A shoulder portion 324 extends transversely from the main portion 322 and extends away from the deployment portion 150a. A fixing portion 326 extends transversely from the shoulder portion 324 and generally parallel to the main portion 322. An aperture 330 extends through the fixing portion 326. A projection 332, such as a hook, projects from a lateral edge of the fixing portion 326 in a direction away from the deployment portion 150a.

As shown in FIGS. 7A and 7B, the fill tube support portion 140a and deployment portion 150a may have edge portions that are rounded over. The connecting portion 130a, fill tube support portion 140a, and deployment portion 150 may also include reinforcing portions, such as ribs, for improving their structural integrity.

In an assembled condition of the apparatus 10a, the brackets 120a may extend through respective apertures in the inflatable curtain and cover (not shown) such that the fill tube (not shown) may be received in the clamping portions 302 of the supports 300. With the fill tube positioned in the supports 300, means (not shown), such as a fastener, may be installed in the overlying apertures 306 and 308 to urge the clamping flange portion 304 against the deployment portion 150a and clamp the fill tube in the supports. The fill tube support portion 140a is thus operative to connect the fill tube to the bracket 120a. The inflatable curtain, cover, fill tube, and inflator (not shown) may be installed in the vehicle in a manner similar to that described in reference to the first embodiment of FIGS. 1–6B.

From the above description of the invention, those skilled in the art will perceive improvements, changes and modifications. Such improvements, changes and modifications within the skill of the art are intended to be covered by the appended claims.

The invention claimed is:

1. An apparatus for helping to protect an occupant of a vehicle that has a roof, a side structure, and a trim piece overlying the side structure, said apparatus comprising:
an inflatable curtain that is inflatable away from the vehicle roof to a position adjacent the side structure of the vehicle;
an inflation fluid source for providing inflation fluid for inflating said inflatable curtain;
a fill tube for directing inflation fluid from said inflation fluid source into said inflatable curtain; and
a bracket for connecting said fill tube to the vehicle, said bracket comprising:
a fill tube support portion connectable with said fill tube;
a connecting portion connectable with the vehicle; and
a deployment portion for directing said inflatable curtain to deploy inboard of the trim piece.

2. The apparatus recited in claim 1, wherein said fill tube support portion has a curved configuration with first and second opposite ends, said connecting portion extending transversely from said first end of said fill tube support portion, said deployment portion extending transversely from said second end of said fill tube support portion.

3. The apparatus recited in claim 1, wherein said fill tube support portion at least partially encircles a portion of said fill tube to connect said bracket to said fill tube.

4. The apparatus recited in claim 1, wherein said fill tube support portion has an inner surface with a cylindrical portion that mates with a cylindrical outer surface of said fill tube.

5. The apparatus recited in claim 1, wherein said fill tube support portion includes a tab portion deformable into engagement with said fill tube to help connect said fill tube support portion to said fill tube.

6. The apparatus recited in claim 1, wherein said deployment portion extends away from the side structure when the bracket is connected to the vehicle.

7. The apparatus recited in claim 1, wherein said deployment portion defines a concave channel for receiving said inflatable curtain in a deflated and stored condition.

8. The apparatus recited in claim 1, wherein said inflatable curtain includes apertures that expose portions of said fill tube, said fill tube support portion connecting with said exposed portions of said fill tube.

9. The apparatus recited in claim 1, further comprising a fabric sheath for at least partially surrounding said inflatable curtain in a stored condition, said inflatable curtain when in said stored condition being is at least one of folded and rolled into a position extending along an intersection of the side structure of the vehicle and the vehicle roof.

10. The apparatus recited in claim 1, wherein said deployment portion comprises a first portion that extends along the side structure of the vehicle away from the vehicle roof and a second portion that extends transverse to said first portion away from the side structure and inboard in the vehicle.

11. The apparatus recited in claim 1, wherein said bracket has a length, said deployment portion extending substantially along the length of said bracket, said fill tube support portion comprising a plurality of supports spaced along the length of said bracket, said connecting portion comprising a plurality of flanges spaced along the length of said bracket.

12. The apparatus recited in claim 1, wherein said deployment portion extends below said inflatable curtain when said inflatable curtain is in a stored and deflated condition.

13. A bracket for supporting a fill tube and an inflatable curtain adjacent a trim piece in a vehicle, said bracket comprising:
a fill tube support portion connectable with the fill tube;
a connecting portion connectable with the vehicle; and
a deployment portion for directing said inflatable curtain to deploy inboard of the trim piece.

14. The bracket recited in claim 13, wherein said fill tube support portion has a curved configuration with first and second opposite ends, said connecting portion extending transversely from said first end of said fill tube support portion, said deployment portion extending transversely from said second end of said fill tube support portion.

15. The bracket recited in claim 13, wherein said fill tube support portion includes a tab portion deformable into engagement with said fill tube to help connect said fill tube support portion to said fill tube.

16. The bracket recited in claim 13, wherein said deployment portion defines a concave channel for receiving said inflatable curtain in a deflated and stored condition.

17. The bracket recited in claim 13, wherein said deployment portion extends below the inflatable curtain when the inflatable curtain is in a stored and deflated condition.

18. An apparatus for helping to protect an occupant of a vehicle that has a roof, a side structure, and a trim piece overlying the side structure, said apparatus comprising:
   an inflatable curtain that is inflatable away from the vehicle roof to a position adjacent the side structure of the vehicle;
   an inflation fluid source for providing inflation fluid for inflating said inflatable curtain;
   a fill tube for directing inflation fluid from said inflation fluid source into said inflatable curtain; and
   a bracket for connecting said fill tube to the vehicle and for directing said inflatable curtain to deploy inboard of the trim piece.

19. A bracket for supporting a fill tube and an inflatable curtain adjacent a trim piece in a vehicle, said bracket comprising:
   a fill tube support portion connectable with the fill tube;
   a connecting portion connectable with the vehicle; and
   a deployment portion for directing said inflatable curtain to deploy inboard of the trim piece;
   the fill tube support portion including a portion deformable into engagement with the fill tube to help connect said fill tube support portion to said fill tube.

20. A bracket for supporting a fill tube and an inflatable curtain adjacent a trim piece in a vehicle, said bracket comprising:
   a fill tube support portion connectable with the fill tube;
   a connecting portion connectable with the vehicle; and
   a deployment portion for directing said inflatable curtain to deploy inboard of the trim piece;
   the fill tube support portion being connectable with a portion of the fill tube exposed by an aperture in the inflatable curtain.

21. The apparatus recited in claim 13, wherein said fill tube support portion extends between said connecting portion and said deployment portion.

22. The apparatus recited in claim 1, wherein said fill tube support portion extends between said connecting portion and said deployment portion.

23. The apparatus recited in claim 1, wherein the deployment portion extends away from the side structure of the vehicle.

24. The apparatus recited in claim 1, wherein the deployment portion extends in a direction away from the vehicle roof and inboard in the vehicle.

* * * * *